United States Patent
Chen et al.

(10) Patent No.: US 11,246,102 B2
(45) Date of Patent: Feb. 8, 2022

(54) WIRELESS COMMUNICATION DEVICE AND DYNAMIC ANTI-INTERFERENCE METHOD FOR THE SAME

(71) Applicant: REALTEK SEMICONDUCTOR CORP., Hsinchu (TW)

(72) Inventors: Chien-Yu Chen, Hsinchu (TW); Chih-Hung Tsai, Kaohsiung (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/853,026

(22) Filed: Apr. 20, 2020

(65) Prior Publication Data

US 2020/0359333 A1     Nov. 12, 2020

(30) Foreign Application Priority Data

May 6, 2019 (TW) .................................. 108115519

(51) Int. Cl.
*H04W 52/24* (2009.01)
*H04W 16/14* (2009.01)
(Continued)

(52) U.S. Cl.
CPC ........ *H04W 52/243* (2013.01); *H04B 17/318* (2015.01); *H04B 17/336* (2015.01);
(Continued)

(58) Field of Classification Search
CPC ... H04B 17/318; H04B 17/336; H04W 16/14; H04W 52/146; H04W 52/243; H04W 52/245; H04W 52/52; H04W 84/12
(Continued)

(56) References Cited

U.S. PATENT DOCUMENTS 6,898,412 B2 *   5/2005   Hayashihara ....... H04W 52/367
                                                                    455/1
8,750,926 B2      6/2014   Fu et al.
(Continued)

FOREIGN PATENT DOCUMENTS

CN    104365157 A    2/2015
CN    105898855 A    8/2016
(Continued)

OTHER PUBLICATIONS

China Patent Office, Office action dated Jul. 7, 2021.

*Primary Examiner* — Tan H Trinh
(74) *Attorney, Agent, or Firm* — Li & Cai Intellectual Property (USA) Office

(57) ABSTRACT

A wireless communication device and a dynamic anti-interference method for the same are provided. The device includes at least two wireless communication circuits. When the method operates in the wireless communication device, the device monitors activities of every wireless communication circuit through a clear channel assessment method for acquiring signal strength of every wireless communication circuit. The assessment allows the device to perform a corresponding anti-interference measure for each of the wireless communication circuits. For example, when the device acknowledges that a second wireless communication circuit of the device starts to work as a first wireless communication circuit transmits or receives signals, the device controls a receiver or a transmitter of the second wireless communication circuit to perform an anti-interference measure such as a gain control for a receiver or power adjustment for a transmitter.

20 Claims, 6 Drawing Sheets

(51) Int. Cl.
   *H04W 84/12*    (2009.01)
   *H04W 52/14*    (2009.01)
   *H04W 52/52*    (2009.01)
   *H04B 17/336*   (2015.01)
   *H04B 17/318*   (2015.01)

(52) U.S. Cl.
   CPC ......... *H04W 16/14* (2013.01); *H04W 52/146* (2013.01); *H04W 52/245* (2013.01); *H04W 52/52* (2013.01); *H04W 84/12* (2013.01)

(58) Field of Classification Search
   USPC ..................... 455/1, 73, 165.1, 200.1, 522
   See application file for complete search history.

(56) References Cited

U.S. PATENT DOCUMENTS

| | | | |
|---|---|---|---|
| 8,964,877 B2 | 2/2015 | Weinrib et al. | |
| 9,628,122 B1* | 4/2017 | Clark | H04B 1/0475 |
| 9,667,212 B2 | 5/2017 | Chen | |
| 2001/0027113 A1* | 10/2001 | Hayashihara | H04W 52/367 |
| | | | 455/522 |
| 2003/0153291 A1* | 8/2003 | Tsushima | H03G 3/3052 |
| | | | 455/200.1 |
| 2005/0215212 A1* | 9/2005 | Uryu | H04B 1/1027 |
| | | | 455/165.1 |
| 2008/0094176 A1* | 4/2008 | Taira | H04B 1/59 |
| | | | 340/10.1 |
| 2009/0253450 A1* | 10/2009 | Gupta | H04W 72/082 |
| | | | 455/509 |
| 2011/0051639 A1* | 3/2011 | Ramakrishnan | H04W 52/028 |
| | | | 370/311 |
| 2013/0084810 A1* | 4/2013 | Matsubara | H04B 1/1036 |
| | | | 455/73 |
| 2015/0319720 A1* | 11/2015 | Svedman | H04W 52/52 |
| | | | 455/522 |
| 2015/0365971 A1* | 12/2015 | Chen | H04W 74/0816 |
| | | | 370/252 |
| 2018/0270815 A1 | 9/2018 | Bala et al. | |
| 2021/0168822 A1* | 6/2021 | Murayama | H04W 16/14 |

FOREIGN PATENT DOCUMENTS

| | | |
|---|---|---|
| EP | 2452538 B1 | 5/2017 |
| TW | 201208267 A1 | 2/2012 |
| TW | I565232 B | 1/2017 |

\* cited by examiner

WIRELESS COMMUNICATION DEVICE AND DYNAMIC ANTI-INTERFERENCE METHOD FOR THE SAME

CROSS-REFERENCE TO RELATED PATENT APPLICATION

This application claims the benefit of priority to Taiwan Patent Application No. 108115519, filed on May 6, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is related to a wireless communication circuit, and in particular to a circuit used to improve interference caused by integration of two types of wireless communication circuits, and a dynamic anti-interference method for the same.

BACKGROUND OF THE DISCLOSURE

With the rapid development of communication technology, electronic devices, such as a personal mobile device, a computer and a music player, are equipped with wireless communication function. Related wireless communication protocols using Bluetooth communication and WiFi are often used in the electronic devices. However, these types of wireless communication may be interfered with each other when the same radio frequency band is used in an integrated device.

For example, the Bluetooth communication circuit and the WiFi circuit are often integrated into a combo circuit. Both wireless communication circuits in the combo circuit may operate in 2.4 GHz of Industrial Scientific Medical (ISM) Band. They may be interfered if both communication circuits operate at the same time. The interference may lead to poor reception ability. Further, the user experience may be affected when the probability of packet retransmission becomes higher during transmission under a wireless communication protocol.

In order to solve the problem that the performance is affected by the interference due to the different wireless communication circuits operating at the same time, the mechanism of time division or frequency division is commonly used in the conventional technology. However, those mechanisms have problems such as short operating time or small signal coverage, and diminished resistance to external interference. A new solution allowing different wireless communication circuits coexist in one device is required.

SUMMARY OF THE DISCLOSURE

Since the two wireless communication circuits in one wireless communication circuit interfere with each other, and the conventional technology of time division or frequency division suffers from problems such as shorter working hours, smaller signal coverage, or reduction of resistance to external interference, provided herein is a method for dynamically switching parameters for anti-interference. At least two wireless communication circuits of the wireless communication device do not affect each other by the method of the disclosure, and the method also allows each of the wireless communication circuits to work at a maximum transmission rate. The method successfully improves the problems that the interference among the wireless communication circuits still exists even if the device adopts time-division or frequency-division technology.

In one embodiment of the disclosure, the wireless communication device includes at least two wireless communication circuits. A radio-frequency circuit in each of the wireless communication circuits includes a transmitter and a receiver. The device includes a control circuit that is used to perform a dynamic anti-interference method in the wireless communication device. The control circuit controls the transmitter and the receiver of the wireless communication circuit to use anti-interference parameters and the timing thereof.

Further, in the dynamic anti-interference method, when one of the wireless communication circuits is transmitting or receiving signals, the control circuit acknowledges that another wireless communication circuit starts to receive or transmit signals, and control circuit will control the receiver or the transmitter of the later-operating wireless communication circuit to conduct an anti-interference measure.

The mentioned anti-interference measure provides a wireless communication device to control a receiver of a later-operating wireless communication circuit to use a gain value according to a gain control table. For example, the gain control table describes an input power of the receiver corresponding to the gain values of a front-end amplifier and a back-end amplifier of the receiver.

In the anti-interference measure, the wireless communication device controls the transmitter of the later-operating wireless communication circuit to set up a transmission power according to a power control table. The power control table describes a magnitude of the transmission power reduced by the wireless communication device.

In one further embodiment of the disclosure, the wireless communication device includes at least two wireless communication circuits such as a first wireless communication circuit and a second wireless communication circuit. One of the wireless communication circuits is a WiFi communication circuit, and the other one is a Bluetooth communication circuit. The radio-frequency circuit of the wireless communication circuit includes the transmitter and the receiver that conducts the dynamic anti-interference method.

The wireless communication device monitors the activity of every wireless communication circuit in each channel by a clear channel assessment method. After that, a working mode of the first wireless communication circuit or the second wireless communication circuit can be obtained.

In the anti-interference measure, when the transmitter of the first wireless communication circuit is transmitting signals, the control circuit determines if the receiver of the second wireless communication circuit starts to receive signals. Further, when the receiver of the first wireless communication circuit is receiving signals, it is determined whether the transmitter of the second wireless communication circuit has started to transmit signals.

When the first wireless communication circuit is transmitting or receiving signals, the wireless communication device controls the receiver or the transmitter of the later-operating second wireless communication circuit conducts the anti-interference measure if the device acknowledges that the second wireless communication circuit starts to receive or transmit signals.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
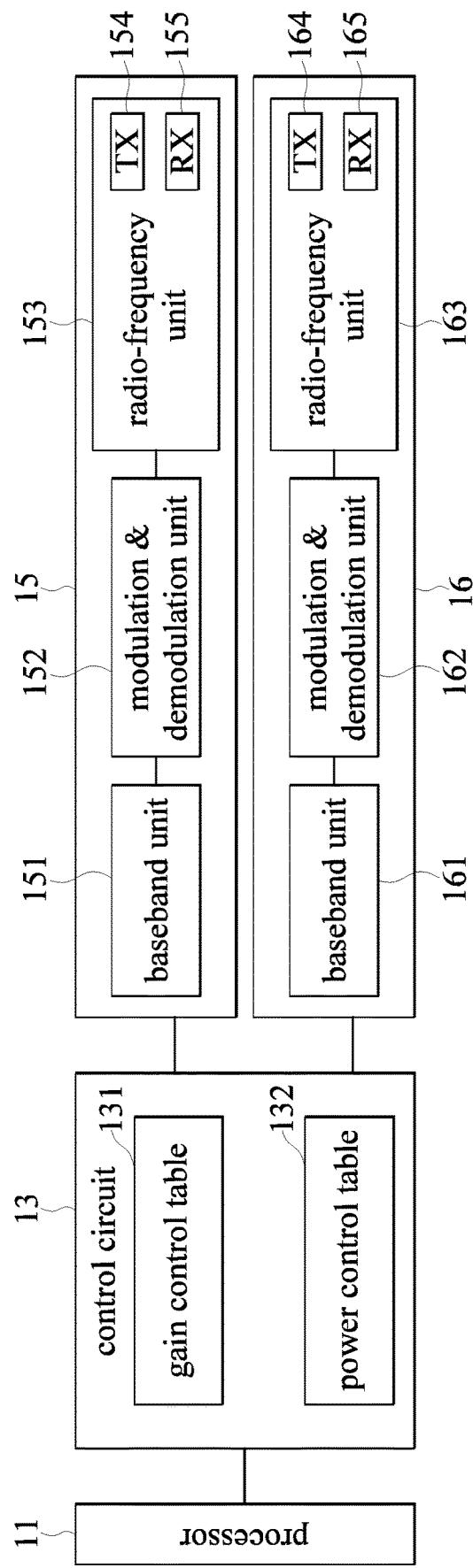
FIG. 1 shows a circuit block diagram depicting a wireless communication device that performs a dynamic anti-interference method in one embodiment of the disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is related to a wireless communication device that integrates at least two wireless communication circuits such as a first wireless communication circuit and a second wireless communication circuit. In particular, the two communication circuits respectively support two different communication protocols. For improving the problems relating to a frequency-division mechanism applied to the at least two wireless communication circuits, a dynamic anti-interference method for the wireless communication device is further provided. A control circuit of the wireless communication device is used to control the transmitters and the receivers in the wireless communication circuits to use the anti-interference parameters and the timing for applying the anti-interference parameters. Therefore, the problems such as interference and lower signal coverage can be improved when the wireless communication circuits are integrated into one device.

According to the dynamic anti-interference method operated in the wireless communication device that includes at least two wireless communication circuits in one embodiment of the disclosure, the method allows the at least two wireless communication circuits to acknowledge each other's working time accurately and the current work of the receiver (RX) or transmitter (TX). The control circuit of the wireless communication device can make a decision on whether or not the anti-interference parameters are to be applied when receiving or transmitting signals. Accordingly, the anti-interference parameters can be applied to the device dynamically.

During the dynamic anti-interference method, when the transmitter or receiver of one of the wireless communication circuits of the device is working, the control circuit controls the transmitter or the receiver of the other wireless communication circuit to apply the anti-interference parameters since it obtains a working mode of the other wireless communication circuit. It should be noted that the working mode of any of the wireless communication circuits indicates that the circuit starts to transmit or receive signals.

Furthermore, when the first wireless communication circuit of the device is working, the device applies the anti-interference measure to the second wireless communication circuit which starts working later and works together with the first wireless communication circuit. For example, when the control circuit of the wireless communication device acknowledges that the receiver (RX) of the first wireless communication circuit is receiving signals, and simultaneously the transmitter (TX) of the second wireless communication circuit starts to transmit signals, the control circuit controls the transmitter of the second wireless communication circuit to apply the anti-interference parameters. One of the measures in the anti-interference measure is to reduce a transmission power of the transmitter so as to reduce the interference occurring in the receiver of the wireless communication circuit. On the other hand, when the transmitter (TX) of the first wireless communication circuit is transmitting signals, and the receiver (RX) of the second wireless communication circuit starts to receive signals, the control circuit will control the receiver (RX) of the later-operating second wireless communication circuit to apply the anti-interference parameters. For example, the control circuit can conduct gain control to the receiver according to a predetermined gain control table so as to reduce the interference occurring on the transmission operated by the first wireless communication circuit.

Reference is made to FIG. 1 showing a circuit block diagram of a wireless communication device in one embodiment of the disclosure. The wireless communication device can be any kind of electronic device such as a personal mobile device, a computer device or a music player. One of the main circuits of the device is a processor 11 that is used to process packets and signals among circuit elements, and a memory (not shown). The wireless communication device includes a control circuit 13 electrically connected with the processor 11, that is used to receive a control instruction generated by the processor 11. In response to the control instruction, the control circuit 13 controls a working mode of a first wireless communication circuit 15 and a second wireless communication circuit 16. The control circuit 13 of the wireless communication device performs the dynamic anti-interference method. The control circuit 13 incorporates a gain control table 131 and a power control table 132 for setting up the first wireless communication circuit 15 and the second wireless communication circuit 16. The control circuit 13 applies the anti-interference measure to the transmitter and the receiver of the device.

In one embodiment, but without limiting the invention described in the disclosure, the first wireless communication circuit 15 and the second wireless communication circuit 16 can be selected from a Bluetooth communication circuit, a Wireless LAN (WLAN) communication circuit, a ZigBee circuit, a Near-field communication (NFC) circuit, a Cellular network circuit, a Radio Frequency Identification (RFID) circuit, and a Worldwide Interoperability for Microwave Access (WiMAX) circuit respectively. Generally, WiFi is a certain type of WLAN. The main circuits of the first wireless communication circuit 15 include a baseband unit 151 that is used to conduct conversion between electromagnetic wave signals and digital signals; a modulation/demodulation unit 152 that is used to process signals generated or received by the wireless communication device, and also used to modulate the digital signals and the electromagnetic wave signals; and a radio-frequency unit 153. The radio-frequency unit 153 includes a transmitter (TX) 154 and a receiver (RX) 155. The radio-frequency unit 153 can process the signals generated by the wireless communication device as electromagnetic wave signals in a specific frequency. The electromagnetic wave signals are transmitted via the transmitter 154. The radio-frequency unit 153 conducts high-to-low frequency signal conversion on the electromagnetic wave signals received by the receiver 15, and the subsequent demodulation.

Similarly, the main circuits of the second wireless communication circuit 16 include a baseband unit 161, a modulation and demodulation unit 162 and a radio-frequency unit 163. The radio-frequency unit 163 also includes a transmitter (TX) 164 and a receiver (RX) 165 that are used to transmit and receive signals.

The dynamic anti-interference method is based on an aspect that the at least two wireless communication circuits 15, 16 in the wireless communication device can acknowledge each other's working time and receiving status or transmitting status accurately. Therefore, the control circuit 13 can accordingly determine whether or not the anti-interference parameters are applied to the signals to be transmitted or received. The control circuit 13 can also determine an appropriate time to apply the anti-interference measure to the signals transmitted by the transmitter (TX) or received by the receiver (RX) of each of the wireless communication circuits 15, 16. The anti-interference measure is such as reducing transmission power of the transmitter, or performing a gain control on the signals received by the receivers.

In one embodiment of the disclosure, the anti-interference parameters can be applied on a front-end amplifier and a back-end amplifier over a receiving path (RX) in the wireless communication device. The anti-interference parameters applied to the related receiver are exemplarily shown in the gain control table, e.g., Table 1 and Table 2. The anti-interference parameters applied to the transmitter can also be shown in a comparison table for power control. Table 3 exemplarily shows the power control table. The circuits of the receiver of the wireless communication circuit can be referred to in a schematic diagram shown in FIG. 2.

Figure 2:
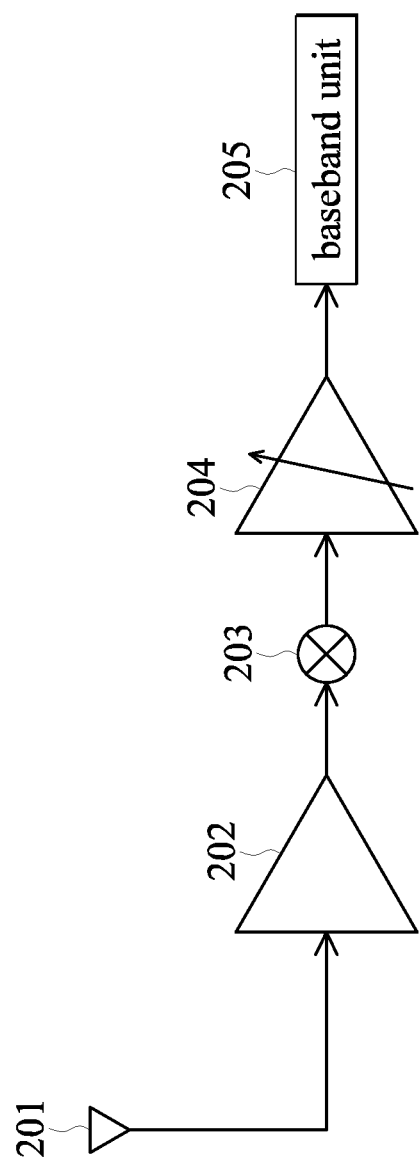
FIG. 2 shows a receiver circuit of the wireless communication circuit in one embodiment of the disclosure.

FIG. 2 shows a circuit block depicting a receiver of the wireless communication circuit in one embodiment of the disclosure. The receiver receives external signals via an antenna 201. A low noise amplifier (LNA) 202 acts as a front-end circuit of a channel for receiving and transmitting signals. After receiving electromagnetic wave signals via the antenna, the signals are then amplified to an available level for the wireless communication circuit. It should be noted that the available level of signals are such as large dynamic range of input signals undergoing gain control.

Next, the input signals are inputted to a mixer 203. One of main tasks of the mixer 203 is to perform frequency conversion of signals. For example, the mixer 203 of the receiver performs down-conversion on the radio frequency signals to intermediate frequency signals or baseband signals that are provided for the wireless communication circuit to conduct subsequent processing and demodulation. On the contrary, the mixer 203 of the transmitter performs up-conversion frequency and modulation of the signals.

The signals are then transmitted to a programmable gain amplifier (PGA) 204. In the wireless communication circuit, the programmable gain amplifier 204 implements an amplifier for user-programmable gain, in which the amplifier prepares various selectable gains. In one embodiment, an output of the programmable gain amplifier 204 connects to a baseband unit 205 of the wireless communication circuit. The programmable gain amplifier 204 determines if another wireless communication circuit is in operation for transmitting signals while the wireless communication circuit receives signals. A gain control table setting in the device is used to set up a gain. The received signals are then transferred to the baseband unit 205 for performing analog-to-digital conversion (ADC).

For example, in the receiver of the wireless communication circuit, e.g. WiFi communication circuit, Table 1 shows an example of gain control table applicable to the receiver of the WiFi communication circuit. The gain control table describes input powers for the receiver corresponding to gain values applied to the front-end amplifier and the back-end amplifier of the receiver. Further, a low noise amplifier 202 may act as the front-end amplifier of the receiver, and a programmable gain amplifier 204 may act as the back-end amplifier.

In an exemplary example, the gain control table shown in Table 1 records various gain values corresponding to the different input powers. When one of the wireless communication circuits, e.g. WiFi, of the wireless communication device works for receiving or transmitting signals, the receiver can work with the input power for dynamically switching the gains for the back-end amplifier according to Table 1 if no other circuits work at the same time. It should be noted that the gain values can be dynamically switched according to the aspect of the invention. In general, the gain control table of Table 1 provides the parameters under a low signal-noise ratio (SNR) if only one wireless communication circuit is in operation.

TABLE 1 an example of a gain control table operated in a receiver of WiFi communication circuit.

| input power | front-end amplifier | back-end amplifier |
|---|---|---|
| −60 dBm | 40 | 20 |
| −58 dBm | 40 | 18 |
| −56 dBm | 40 | 16 |

Further, in another aspect of the disclosure, when the other wireless communication circuit, e.g. Bluetooth, of the wireless communication device is currently working (e.g., transmitting signals) the WiFi. Communication circuit starts to receive signals. In the meantime, the control circuit of the wireless communication device will control the receiver to apply the anti-interference parameters. Table 2 shows an example of gain values applicable to the front-end amplifier, e.g. the low noise amplifier 202 and the back-end amplifier, e.g. the programmable gain amplifier 204 under various input powers.

TABLE 2 an example of a gain control table operated in a receiver of the WiFi communication circuit when the Bluetooth communication circuit is transmitting signals.

| input power | front-end amplifier | back-end amplifier |
|---|---|---|
| −60 dBm | 30 | 40 |
| −58 dBm | 30 | 28 |
| −56 dBm | 30 | 26 |

In an exemplary example of the dynamic anti-interference method, when the transmitter (TX) of the first wireless communication circuit is activated and ready to transmit signals, the control circuit will reduce a transmission power of the transmitter if the control circuit acknowledges that the receiver (RX) of the second wireless communication circuit is currently working. A comparison table such as Table 3 is therefore established. According to a power control table shown in Table 3, when the receiver working as the transmitter is under a working mode, the transmission power of the transmitter will be reduced.

TABLE 3 an example of power control table.

| transmitter working mode | transmission power |
|---|---|
| working alone | 15 dBm |
| working together | 10 dBm |

When setting an automatic gain control for the receiver according to the gain control table 131 in the control circuit 13 of FIG. 1, the control circuit 13 adjusts power for the transmitter according to the power control table 132.

Figure 3:
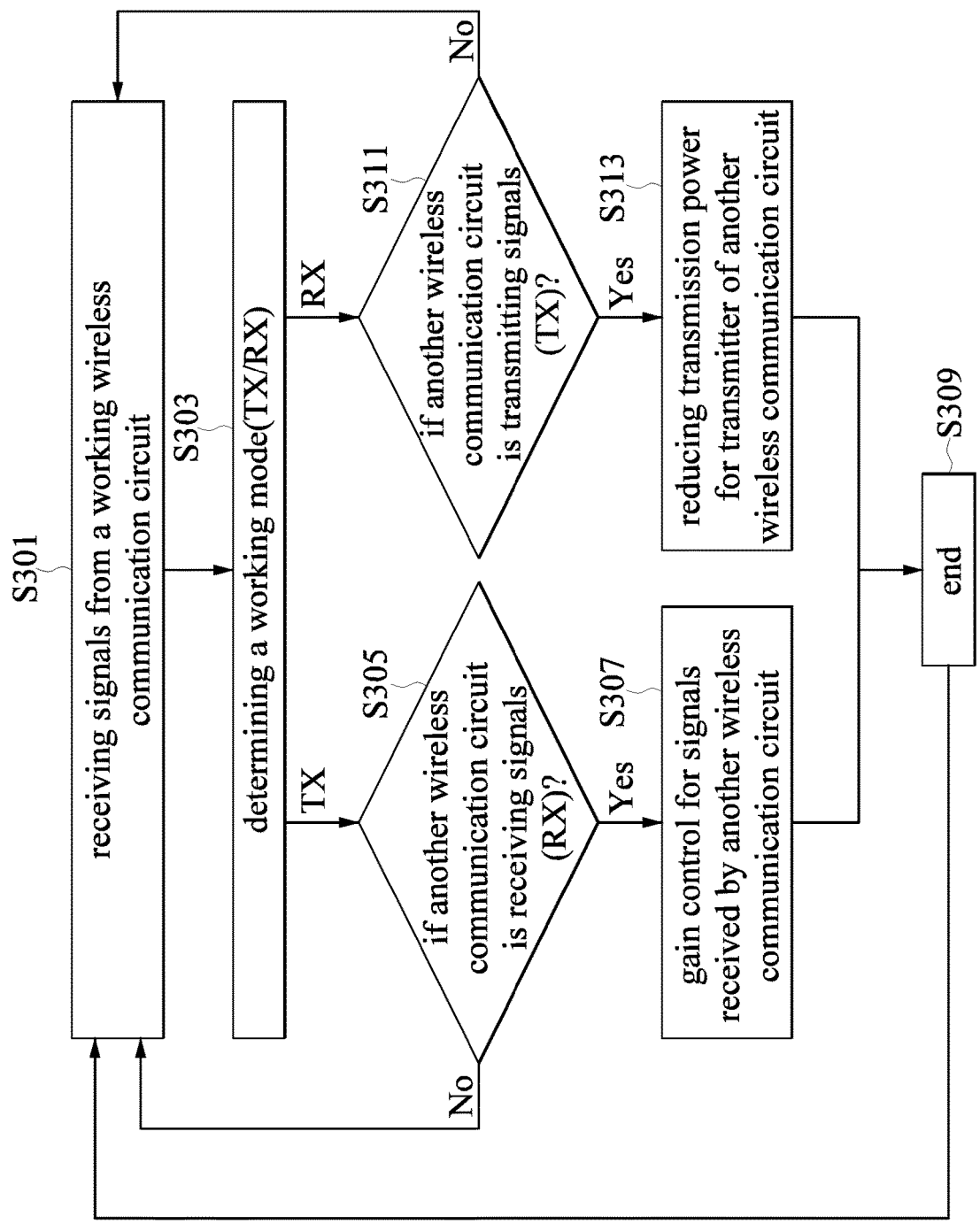
FIG. 3 shows a flow chart describing a dynamic anti-interference method according to one embodiment of the disclosure.

In the dynamic anti-interference method, referring to a flow chart shown in FIG. 3, the control circuit of the wireless communication device obtains a working mode of the transmitter or the receiver of each of the wireless communication circuits, and performs corresponding anti-interference measure. For the receiver, the gain values of the gain control table will be applied. In one embodiment of the disclosure, the control circuit 13 controls the front-end amplifier and the back-end amplifier of the receiver to apply the various anti-interference parameters, e.g. gain values, corresponding to different powers. Similarly, the control circuit 13 controls the transmitter to apply the anti-interference parameters such as reducing a magnitude of transmission power according to the power control table. The anti-interference measure is introduced to the wireless communication device by applying the gain control table and the power control table.

Furthermore, since the different wireless communication protocols operated in the wireless communication device use the same frequency band, the possible interference reduces performance of the device even if the device incorporates a frequency-division technology. Thus, a clear channel assessment (CCA) can be applied to the device for monitoring activity of the wireless communication circuit, e.g., WiFi or Bluetooth, under a specific frequency band. Further, CCA can also be used to monitor non-wireless communication activity under the same frequency band. CCA allows the control circuit to obtain signal strengths (dBm) of every wireless communication circuit, and the wireless communication device can perform the anti-interference measure according to the signal strengths. One of the objectives of the measure is to efficiently use the wireless channels.

When the wireless communication device continues to operate, the at least two wireless communication circuits can successively operate according to control instructions. The transmitter and the receiver may work at the same or different time. The control circuit of the device determines whether or not the transmitter or receiver of the other wireless communication circuit is working so as to control the later-operating transmitter or receiver to apply the anti-interference measure, e.g. applying the anti-interference parameters in the gain control table. The following process takes the first and the second wireless communication circuits as an example. It should be noted that the first or the second wireless communication circuit is not limited to the electronic device using any specific wireless communication protocol.

Reference is made to FIG. 3 showing a flow chart describing a dynamic anti-interference method in one embodiment of the disclosure.

In step S301, the control circuit of the wireless communication device performs clear channel assessment for obtaining signals of the first or second wireless communication circuit which is currently working so as to determine a working mode (TX/RX) of the circuit. In step S303, the control circuit determines whether the wireless communication circuit is transmitting signals (TX) or receiving signals (RX).

For example, when the first wireless communication circuit is working, i.e. transmitting signals (TX), in step S305, the control circuit determines if another wireless communication circuit, i.e. the second wireless communication circuit, starts to receive signals (RX). If the second wireless communication circuit is not working, the process goes back to step S301 for determining the working mode of the working circuit by performing clear channel assessment. The wireless communication device can maintain the working parameters of the wireless communication circuit if there is no other wireless communication circuit at work. In another aspect of the invention, in the meantime, the control circuit can apply the preferable working parameters with low SNR to the receiver of the working wireless communication circuit or provide preset transmission power for the transmitter.

Otherwise, when the receiver of the second wireless communication circuit starts to receive signals as the transmitter of the first wireless communication circuit is transmitting signals, such as in step S307, the control circuit applies the anti-interference measure to the receiver of the second wireless communication circuit. For example, the control circuit performs gain control on the signals received by the receiver of the second wireless communication circuit until the current task terminates (step S309). The process then goes back to step S301.

On the other hand, such as in step S301, the control circuit of the wireless communication device performs clear channel assessment. In step S303, the control circuit obtains the working mode (TX/RX) of the first wireless communication circuit which is currently working. When the first wireless communication circuit is currently receiving signals (RX), such as in step S311, the control circuit determines whether or not the second wireless communication circuit starts to transmit signals (TX). However, the process goes back to step S301 if there is no other wireless communication circuits at work. Similarly, the device remains the original working parameters for the wireless communication circuit if only one wireless communication circuit is working. For example, the control circuit can apply the working parameters with low SNR to the working receiver, or allows the working transmitter to use the preset transmission power.

Otherwise, when the first wireless communication circuit is working and the control circuit determines that the second wireless communication circuit starts to transmit signals, such as in step S313, the anti-interference measure will be applied to the transmitter of the second wireless communication circuit. For example, the transmission power applied to the transmitter may be reduced in order to lower the transmission energy of the second wireless communication circuit based on the anti-interference measure. Therefore, the interference caused by the transmitter to the working receiver can be effectively reduced. The anti-interference measure will continue until the current task terminates (step S309).

Further, the control circuit of the wireless communication device determines one of the circuits to apply the anti-interference parameters if the first and the second wireless communication circuits work simultaneously. One of the ways to decide which one of the wireless communication circuits applies the anti-interference parameters is in a random manner, based on a predetermined priority order, or using an order that the device sequentially receives the working statuses.

Thus, the dynamic anti-interference method is performed every time when any wireless communication circuit is activated to transmit or receive signals. The invention can ensure that the wireless communication circuit gets better signal coverage and reduces the interference.

In the following FIGS. 4 to 8, 'BT' represents the Bluetooth communication circuit, 'RX' represents the working mode of receiving signals, and 'TX' represents the working mode of transmitting signals. Further, 'BT RX' indicates the mode of Bluetooth communication circuit receiving signals, and 'BT TX' indicates the mode of Bluetooth communication circuit transmitting signals. Still further, 'WIFI' represents the WiFi communication circuit, 'TX' represents the working mode of transmitting signals, and 'RX' represents the working mode of receiving signals. Thus, 'WIFI TX' indicates the mode of WiFi communication circuit transmitting signals, and 'WIFI RX' indicates the mode of WiFi communication circuit receiving signals. The horizontal axis shown in FIGS. 4 to 8 is as a time axis. In addition, the wireless communication circuit shown in FIGS. 4 to 8 is as an exemplary example, and the invention is not limited to the Bluetooth and WiFi communication circuits.

Figure 4:
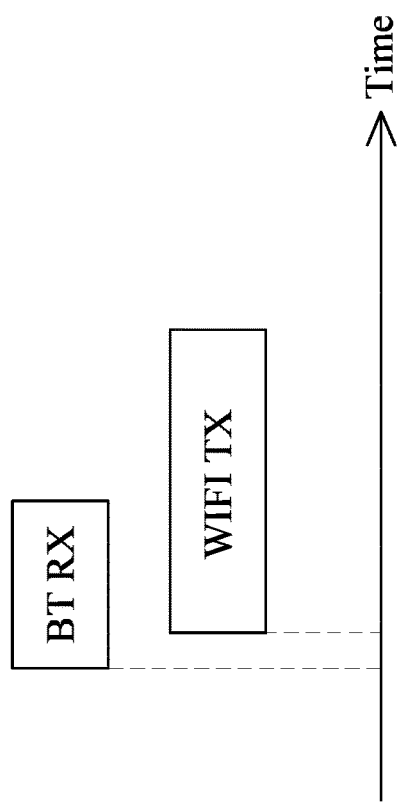
FIGS. 4-7 is a schematic diagram depicting using a given time to use anti-interference parameters dynamically in one embodiment of the disclosure.

FIG. 4 is a schematic diagram depicting that the anti-interference parameters are dynamically applied at a known time according to one embodiment of the disclosure. In the diagram, the Bluetooth communication circuit is at a working mode 'BT RX' of receiving signals, and the WiFi communication circuit is then at a working mode 'WIFI TX' of transmitting signals after a while. In this aspect, when the WiFi communication circuit starts to transmit signals (WIFI TX), the control circuit of the wireless communication device already acknowledges that the Bluetooth communication circuit is at the mode of receiving signals, and it is unable to change the working parameters of the Bluetooth communication circuit. The control circuit therefore performs dynamic anti-interference method. Firstly, the control circuit obtains the working mode of the WiFi communication circuit from a header of WiFi packets. The control circuit then applies anti-interference measure to the transmitter of the WiFi communication circuit. The anti-interference measure is such as reducing transmission power of the transmitter so as to reduce interference due to the two circuits working simultaneously.

Figure 5:
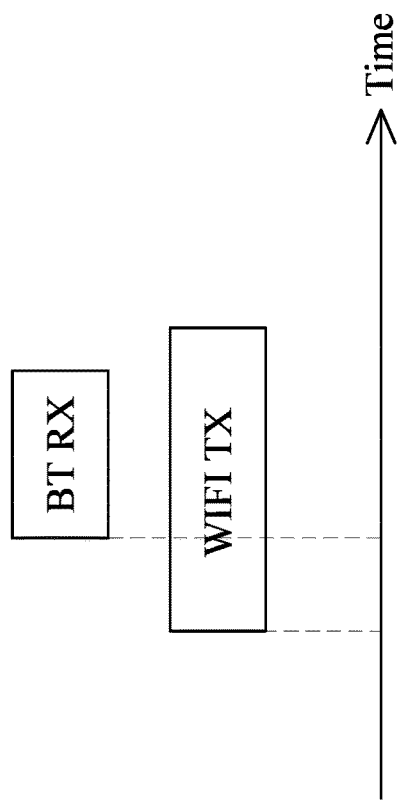

FIG. 5 shows a situation that the WiFi communication circuit firstly transmits signals (WIFI TX) prior to the Bluetooth communication circuit. The control circuit obtains a working mode from a header of WiFi packets. After a while, the receiver of the Bluetooth communication circuit starts to receive signals (BT RX). Since it is unable to change working parameters of the WiFi communication circuit in this aspect, the control circuit controls the receiver of the Bluetooth communication circuit to apply the anti-interference parameters so as to reduce interference due to the two circuits working simultaneously.

Figure 6:
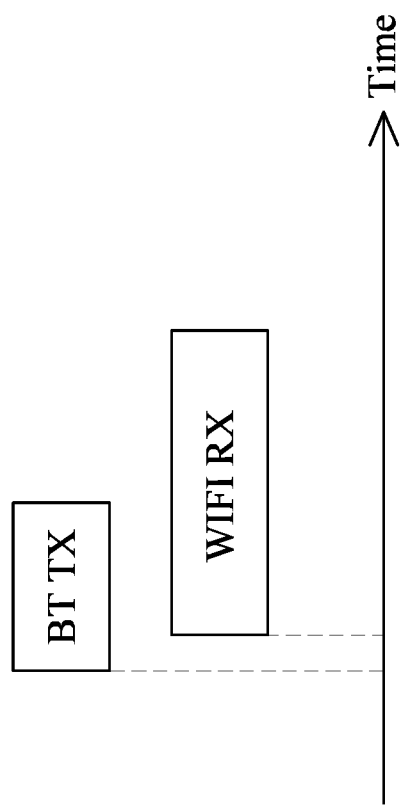

FIG. 6 shows one further situation that the Bluetooth communication circuit is firstly transmitting signals (BT TX), and the WiFi communication circuit then receives signals (WIFI RX) after a while. Since the control circuit can acknowledge that Bluetooth communication circuit is transmitting signals (BT TX) prior to the WiFi communication circuit, the control circuit applies the anti-interference parameters to the receiver of the WiFi communication circuit so as to reduce interference due to the two circuits working simultaneously.

Figure 7:
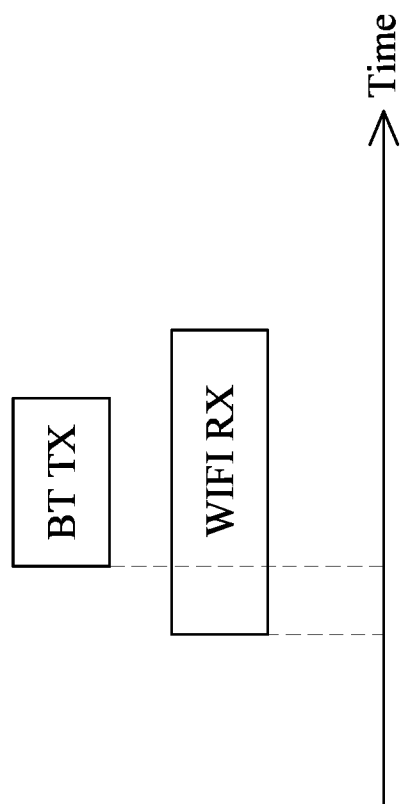

FIG. 7 shows that the receiver of the WiFi communication circuit is receiving signals (WIFI RX) prior to the Bluetooth communication circuit. The transmitter of the Bluetooth communication circuit starts to transmit signals (BT TX) after a while. The control circuit applies anti-interference measure to the transmitter of the Bluetooth communication circuit so as to reduce the transmission power of the transmitter. The interference caused by the transmitter of the Bluetooth communication circuit can be reduced.

Figure 8:
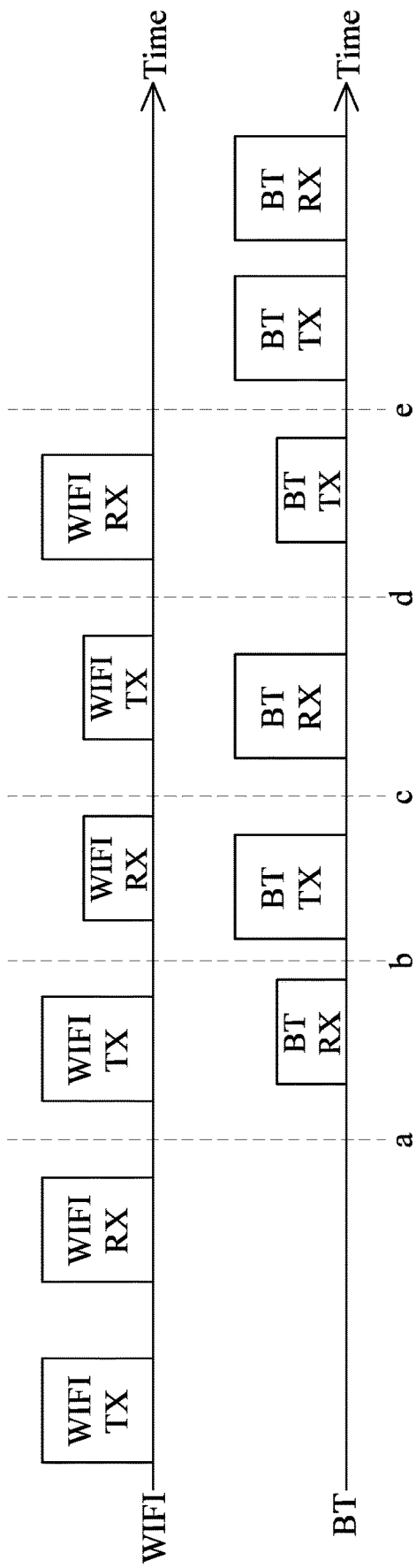
FIG. 8 is a schematic diagram depicting the transmitter and the receiver using anti-interference parameters when they work alternately.

Reference is made to FIG. 8, which shows a schematic diagram depicting applying anti-interference parameters to the transmitters and the receivers of two wireless communication circuits when the circuits work alternately.

An operation timing of the transmitter (WIFI TX) and the receiver (WIFI RX) of the first wireless communication circuit, e.g. WiFi communication circuit (WIFI) is shown above the FIG. 8. Another operation timing of the transmitter (BT TX) and the receiver (BT RX) of the second wireless communication circuit, e.g. Bluetooth communication circuit (BT), is shown below in FIG. 8.

As FIG. 8 shows, only the transmitter and receiver of the first wireless communication circuit are working (WIFI TX/RX) before time 'a'. In the meantime, the first wireless communication circuit may adopt the working parameters with normal power and lower SNR.

Between time 'a' and time 'b', the transmitter of the first wireless communication circuit works first (WIFI TX), and then the receiver of the second wireless communication circuit works (BT RX). In the meantime, the receiver of the later-operating second wireless communication circuit applies the anti-interference parameters.

Between time 'b' and time 'c', the transmitter of the second wireless communication circuit works first (BT TX), and then the receiver of the first wireless communication circuit works (WIFI RX). The anti-interference parameters can be applied to the receiver of the later-operating first wireless communication circuit at the beginning of the working time.

Between time 'c' and time 'd', the receiver of the second wireless communication circuit works first (BT RX), and then the transmitter of the first wireless communication circuit works (WIFI TX). When the transmitter of the first wireless communication circuit starts to work (WIFI TX), the control circuit reduces transmission power for the transmitter (WIFI TX).

Between time 'd' and time 'e', the receiver of the first wireless communication circuit works first (WIFI RX), and then the transmitter of the second wireless communication circuit starts to work (BT TX). When the transmitter starts to work, the control circuit reduces the transmission power for the transmitter (BT TX). Upon reaching time 'e', the transmitter of the second wireless communication circuit works alone (BT TX), and the receiver of the second wireless communication circuit then works alone (BT RX). In this period of time, the normal and low SNR working parameters are applied.

The anti-interference measure described in the above examples can also be applicable to any wireless communication device that integrates two or more wireless communication circuits, especially a combo circuit that integrates heterogeneous communication circuits. It should be noted that the above-mentioned first wireless communication circuit and second wireless communication circuit are not limited to indicate the Bluetooth communication circuit (BT) and the WiFi communication circuit (WIFI) respectively, but can be exchanged and extended to other kinds of communication circuits. The mentioned wireless communication circuit can be replaced with ZigBee, Near-Field Communication (NFC), cellular network, wireless Radio-Frequency Identification (RFID) or Worldwide Interoperability for Microwave Access (WiMAX), etc.

In summation, the above described embodiments relating to a dynamic anti-interference method are generally applied to a wireless communication device that integrates at least two wireless communication circuits. The mechanism of the anti-interference measure allows the different wireless communication circuits in one device to acknowledge each other's working time and working mode accurately, and therefore determine the timing to apply the anti-interference parameters for achieving the purpose of dynamically switching anti-interference parameters. The problems such as interference occurring between the heterogeneous wireless communication circuits and reduction of signal covering can be improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dynamic anti-interference method, adapted to a wireless communication device that includes a control circuit, at least two types of wireless communication circuits, and a radio-frequency circuit in each of the wireless communication circuits includes a transmitter and a receiver, the method comprising:
the wireless communication device controlling a receiver or a transmitter of a second wireless communication circuit that operates later than a first wireless communication circuit to perform an anti-interference measure to reduce interference due to the wireless communication circuits operating simultaneously if the control circuit acknowledges that the second wireless communication circuit starts to transmit or receive signals when the first wireless communication circuit of the wireless communication device is transmitting or receiving signals, wherein the first wireless communication circuit and the second wireless communication circuit are within the wireless communication device, wherein the control circuit controls the first wireless communication circuit not to perform the anti-interference measure.

2. The method according to claim 1, wherein, after the transmitter of the first wireless communication circuit transmits signals, the receiver of the second wireless communication circuit starts to receive signals, and the control circuit of the wireless communication device controls the receiver of the second wireless communication circuit to adopt a gain value according to a gain control table.

3. The method according to claim 2, wherein the gain control table describes an input power of the receiver corresponding to gain values of a front-end amplifier and a back-end amplifier of the receiver.

4. The method according to claim 3, wherein the front-end amplifier is a low noise amplifier of the receiver and the back-end amplifier is a programmable gain amplifier of the receiver.

5. The method according to claim 1, wherein, after the receiver of the first wireless communication circuit receives signals, the transmitter of the second wireless communication circuit starts to transmit signals, and the wireless communication device controls the transmitter of the second wireless communication circuit to set up a transmission power according to a power control table.

6. The method according to claim 5, wherein the power control table describes a magnitude of a transmission power reduced by the transmitter of the second wireless communication circuit controlled by the wireless communication device.

7. The method according to claim 1, wherein the anti-interference measure controls the transmitter of each of the wireless communication circuit to reduce a transmission power and performs gain control to the signals received by the receiver.

8. The method according to claim 7, wherein the wireless communication device monitors activity of each of the wireless communication circuit in each channel through a clear channel assessment process so as to obtain a signal strength of the wireless communication circuit in operation, and the wireless communication device performs the corresponding anti-interference measure.

9. A method for dynamic anti-interference, adapted to a wireless communication device that includes a control circuit, at least two types of wireless communication circuits, and a radio-frequency circuit of each of the wireless communication circuits includes a transmitter and a receiver, the method comprising:
the wireless communication device monitoring activity of each of the wireless communication circuits in each channel through a clear channel assessment process so as to obtain a working mode of a first wireless communication circuit or a second wireless communication circuit in operation, wherein the first wireless communication circuit and the second wireless communication circuit are within the wireless communication device; and
determining if the receiver of the second wireless communication circuit starts to receive signals when the transmitter of the first wireless communication circuit transmits signals, and determining if the transmitter of the second wireless communication circuit starts to transmit signals when the receiver of the first wireless communication circuit receives signals;
wherein, when the first wireless communication circuit transmits or receives signals, the control circuit acknowledges that the second wireless communication circuit starts receiving or transmitting signals, and the control circuit of the wireless communication device controls the receiver or the transmitter of the later-operating second wireless communication circuit to perform an anti-interference measure to reduce interference due to the wireless communication circuits operating simultaneously, wherein the control circuit controls the first wireless communication circuit not to perform the anti-interference measure.

10. The method according to claim 9, wherein, after the transmitter of the first wireless communication circuit transmits signals, the receiver of the second wireless communication circuit starts to receive signals, and the control circuit of the wireless communication device controls the receiver of the second wireless communication circuit to adopt a gain value according to a gain control table.

11. The method according to claim 10, wherein the gain control table describes an input power of the receiver corresponding to the gain values of a front-end amplifier and a back-end amplifier of the receiver.

12. The method according to claim 11, wherein the front-end amplifier is a low noise amplifier of the receiver and the back-end amplifier is a programmable gain amplifier of the receiver.

13. The method according to claim 9, after the receiver of the first wireless communication circuit receives signals, the transmitter of the second wireless communication circuit starts to transmit signals, and the wireless communication device controls the transmitter of the second wireless communication circuit to set up a transmission power according to a power control table.

14. The method according to claim 13, wherein the power control table describes a magnitude of a transmission power reduced by the transmitter of the second wireless communication circuit controlled by the wireless communication device.

15. The method according to claim 9, wherein the anti-interference measure controls the transmitter of the wireless communication circuit to reduce a transmission power and performs gain control to the signals received by the receiver.

16. A wireless communication device, comprising:
at least two types of wireless communication circuits, wherein a radio-frequency circuit of each of the wireless communication circuits includes a transmitter and a receiver; and
a control circuit, performing a dynamic anti-interference method adapted to the wireless communication device so as to control the transmitter and the receiver of each of the wireless communication circuits to use anti-interference parameters and to control a timing to use the anti-interference parameters, wherein the method includes:
when one of wireless communication circuits transmits or receives signals, acknowledging that another wireless communication circuit starts to receive or transmit signals, and the control circuit controls the receiver or the transmitter of another later-operating wireless communication circuit to perform an anti-interference measure to reduce interference due to the wireless communication circuits operating simultaneously, wherein the control circuit controls the one of wireless communication circuits not to perform the anti-interference measure.

17. The device according to claim 16, wherein the anti-interference measure causes the wireless communication device to control the receiver of the another wireless communication circuit to adopt a gain value according to a gain control table.

18. The device according to claim 17, wherein the gain control table describes an input power of the receiver corresponding to the gain values of a front-end amplifier and a back-end amplifier of the receiver.

19. The device according to claim 18, wherein the front-end amplifier is a low noise amplifier of the receiver and the back-end amplifier is a programmable gain amplifier of the receiver.

20. The device according to claim 16, wherein the anti-interference measure causes the wireless communication device to control the transmitter of the another wireless communication circuit to set up a transmission power according to a power control table, and the power control table describes a magnitude of the transmission power reduced by the transmitter of the another wireless communication circuit controlled by the wireless communication device.

* * * * *